United States Patent
Hunter

(10) Patent No.: US 11,348,473 B2
(45) Date of Patent: May 31, 2022

(54) SYSTEMS AND METHODS FOR PROVIDING EN ROUTE REROUTING

(71) Applicant: Nexteon Technologies, Inc., Maple Glen, PA (US)

(72) Inventor: Cornelius George Hunter, Cameron Park, CA (US)

(73) Assignee: NEXTEON TECHNOLOGIES, INC., Maple Glen, PA (US)

( * ) Notice: Subject to any disclaimer, the term of this patent is extended or adjusted under 35 U.S.C. 154(b) by 174 days.

(21) Appl. No.: 16/529,933

(22) Filed: Aug. 2, 2019

(65) Prior Publication Data

US 2020/0043351 A1 Feb. 6, 2020

Related U.S. Application Data

(60) Provisional application No. 62/714,345, filed on Aug. 3, 2018.

(51) Int. Cl.
*G08G 5/00* (2006.01)
*G01C 21/34* (2006.01)

(52) U.S. Cl.
CPC ....... *G08G 5/0039* (2013.01); *G01C 21/3415* (2013.01); *G01C 21/3469* (2013.01); *G08G 5/0047* (2013.01)

(58) Field of Classification Search
CPC ............... G08G 5/0039; G08G 5/0047; G01C 21/3415; G01C 21/3469
See application file for complete search history.

(56) References Cited

U.S. PATENT DOCUMENTS

| | | | |
|---|---|---|---|
| 6,085,147 A | 7/2000 | Myers | |
| 6,266,014 B1 | 7/2001 | Fattouche et al. | |
| 8,918,280 B1 | 12/2014 | Heinrich | |
| 9,558,670 B1 * | 1/2017 | Sheth | G01C 21/005 |
| 9,571,978 B1 | 2/2017 | Ananth | |
| 2001/0056316 A1 | 12/2001 | Johnson et al. | |
| 2009/0210109 A1 * | 8/2009 | Ravenscroft | G01C 21/20 |
| | | | 701/26 |
| 2010/0033379 A1 | 2/2010 | Lommen | |

(Continued)

FOREIGN PATENT DOCUMENTS

| | | | |
|---|---|---|---|
| CA | 2897803 A1 | 8/2014 | |
| JP | 2006321475 A | 11/2006 | |

(Continued)

OTHER PUBLICATIONS

Notification Concerning Transmittal of International Preliminary Report on Patentability and International Preliminary Report on Patentability issued by the International Bureau of WIPO in related International Application No. PCT/US2019/044800 dated Feb. 18, 2021, 12 pages.

(Continued)

*Primary Examiner* — Aniss Chad
*Assistant Examiner* — Madison R Hughes
(74) *Attorney, Agent, or Firm* — Gesmer Updegrove, LLP

(57) ABSTRACT

A system is disclosed for providing rerouting information based, in part, on a probability of route acceptance. In accordance with further embodiments, the rerouting information is based, in part, on decision tree analyses involving decisions to request and decisions to not request a reroute.

14 Claims, 10 Drawing Sheets

(56) References Cited

U.S. PATENT DOCUMENTS

| | | | |
|---|---|---|---|
| 2012/0215435 A1* | 8/2012 | Subbu | G08G 5/0013 |
| | | | 701/120 |
| 2013/0080043 A1 | 3/2013 | Ballin et al. | |
| 2015/0035699 A1 | 2/2015 | Yun et al. | |
| 2016/0180715 A1 | 6/2016 | Burke et al. | |
| 2018/0335309 A1* | 11/2018 | Pan | G06F 15/76 |
| 2019/0316925 A1* | 10/2019 | Jang | G01C 21/3492 |
| 2019/0331502 A1* | 10/2019 | Fowe | G01C 21/3492 |
| 2020/0027358 A1 | 1/2020 | Fine | |
| 2021/0116558 A1 | 4/2021 | Chan et al. | |

FOREIGN PATENT DOCUMENTS

| | | |
|---|---|---|
| JP | 2012174266 A | 9/2012 |
| JP | 2016062449 A | 4/2016 |
| WO | 2011009028 A1 | 1/2011 |

OTHER PUBLICATIONS

Annex to Form PCTISA/206 Communication Relating to the Results of the Partial International Search issued by the International Searching Authority, the European Patent Office, in related International Application No. PCT/US2019/044800 dated Oct. 18, 2020, 8 pages.
Annex to Form PCTISA/206 Communication Relating to the Results of the Partial International Search issued by the International Searching Authority, the European Patent Office, in related International Application No. PCT/US2019/047680 dated Jan. 2, 2020, 11 pages.
Communication pursuant to Rules 161(1) and 162 EPC issued by the European Patent Office in related European Patent Application No. 19759097.9 dated Mar. 11, 2021, 3 pages.
International Search Report and Written Opinion of the International Searching Authority dated Dec. 11, 2019, in related International Application No. PCT/US2019/044800, 18 pages.
Schafer et al., Secure Motion Verification using the Doppler Effect, Proceedings of the 9th ACM Conference on Security & Privacy in Wireless and Mobile Networks, pp. 135-145, Darmstadt, Germany, Jul. 18-20, 2016.
Ghose et al., Verifying ADS-B Navigation Information Through Doppler Shift Measurements, IEEE/AIAA 34th Digital Avionics Systems Conference (DASC), Sep. 2015, 11 pages.
Leonardi et al., Air Traffic Security: Aircraft Classification Using ADS-B Message's Phase Pattern, Aerospace, No. 4, v. 51, 2017, 14 pages.
Dolan et al., Aireon Independent Validation of Aircraft Position via Space-Based ADS-B, 2018 Enhanced Solutions for Aircraft and Vehicle Surveillance (ESAVS) Applications Conference, Oct. 17-19, 2018.
Krozel et al., Remote Detection of Turbulence via ADS-B, AIAA Guidance, Navigation, and Control Conference, AIAA SciTech Forum, Jan. 5-9, 2015, Kissimmee, Florida, 12 pages.
International Search Report and Written Opinion of the International Searching Authority dated Feb. 26, 2020, in related International Application No. PCT/US2019/047680, 23 pages.
Nijsure Yogesh Anil et al., Adaptive Air-to-Ground Secure Communication System Based on ADS-B and Wide-Area Multilateration, IEEE Transactions on Vehicular Technology, IEEE Service Center, Piscataway, NJ, US, vol. 65, No. 5, May 1, 2016, pp. 3150-3165.
Steffes et al., FDOA Determination of ADS-B Transponder Signals, Sensor DAA Fusion: Trends, Solutions, Applications (SDF), 2012 Workshop on, IEEE, Sep. 4, 2012, pp. 84-87.
U.S. Appl. No. 62/798,175, filed Jan. 29, 2019.
Kopec et al., Retrieving atmospheric turbulence information from regular commercial aircraft using Mode-S and ADS-B, Atmos. Meas. Tech., 9, pp. 2253-2265, May 2016.
Non-Final Office Action issued by the United States Patent and Trademark Office in related U.S. Appl. No. 16/548,175 dated Jun. 14, 2021, 22 pages.
International Preliminary Report on Patentability issued by the International Bureau of WIPO in related International Application No. PCT/US2019/047680 dated Jul. 27, 2021, 13 pages.
First Examination Report issued by the Intellectual Property India in related India Patent Application No. 202117004023 dated Jan. 31, 2022, 7 pages.
Examiner's Report issued by Innovation, Science and Economic Development (Canadian Intellectual Property Office) in related Canadian Patent Application No. 3,108,711 dated Feb. 11, 2022, 6 pages.
Notice on Reasons for Refusal issued by the Japanese Patent Office in related Japanese Patent Application No. 2021-529248 dated Mar. 1, 2022, 4 pages.
International Search Report and Written Opinion of the International Searching Authority (the European Patent Office) issued in related International Application No. PCT/US2021/049799 dated Feb. 28, 2022, 22 pages.
Zoccarato, MTSAT: Satellite-Based Air Traffic Control System for Japan, Electrical Communication, Alcatel, Brussels, BE, Apr. 1, 1997, pp. 127-132, XP000727632, ISSN: 0013-4252.
Form PTO-892, Notices of References Cited, issued by the United States Patent and Trademark Office in related U.S. Appl. No. 16/548,175 dated Mar. 15, 2022, 1 page.

* cited by examiner

| | R1 | R2 | R3 | R4 | Path | | R1 | R2 | R3 | R4 | E(Savings) |
|---|---|---|---|---|---|---|---|---|---|---|---|
| Probability | 0.6 | 0.2 | 0.5 | 0.7 | | Savings | 5 | 5 | 12 | 7 | |
| Decision: Request R1: | | | | | | | | | | | |
| Sequences | | | | | | | | | | | |
| R1-R4 | 0.6 | | | 0.7 | 0.42 | | 1 | 0 | 0 | 1 | 5.04 |
| R1 | 0.6 | | | 0.3 | 0.18 | | 1 | 0 | 0 | 0 | 0.90 |
| R2-R4 | 0.4 | 0.2 | | 0.7 | 0.06 | | 0 | 1 | 0 | 1 | 0.67 |
| R2 | 0.4 | 0.2 | | 0.3 | 0.02 | | 0 | 1 | 0 | 0 | 0.12 |
| R3 | 0.4 | 0.8 | 0.5 | | 0.16 | | 0 | 0 | 1 | 0 | 1.92 |
| R4 | 0.4 | 0.8 | 0.5 | 0.7 | 0.11 | | 0 | 0 | 0 | 1 | 0.78 |
| None | 0.4 | 0.8 | 0.5 | 0.3 | 0.05 | | 0 | 0 | 0 | 0 | 0.00 |
| Totals | | | | | 1.00 | | | | | | 9.44 |
| Decision: Do not request R1: | | | | | | | | | | | |
| Sequences | | | | | | | | | | | |
| R2-R4 | | 0.2 | | 0.7 | 0.14 | | 0 | 1 | 0 | 1 | 1.68 |
| R2 | | 0.2 | | 0.3 | 0.06 | | 0 | 1 | 0 | 0 | 0.30 |
| R3 | | 0.8 | 0.5 | | 0.40 | | 0 | 0 | 1 | 0 | 4.80 |
| R4 | | 0.8 | 0.5 | 0.7 | 0.28 | | 0 | 0 | 0 | 1 | 1.96 |
| None | | 0.8 | 0.5 | 0.3 | 0.12 | | 0 | 0 | 0 | 0 | 0.00 |
| Totals | | | | | 1.00 | | | | | | 8.74 |

SYSTEMS AND METHODS FOR PROVIDING EN ROUTE REROUTING

PRIORITY

The present application claims priority to U.S. Provisional Patent Application No. 62/714,345, filed Aug. 3, 2018, the disclosure of which is hereby incorporated by reference in its entirety.

BACKGROUND

In the United States, the National Airspace System (NAS) serves several tens of thousands of civil transport flights each day, transporting several millions of passengers and significant volumes of cargo. Given the large number of flights, and considerable cost of fuel and time involved, even seemingly minor improvements in flight time and efficiency can yield substantial economic savings.

One source of inefficiency, and opportunity for savings, is the routes used by civil transport flights. Civil transport routes are subject to several complicating factors and constraints, including: weather, airspace availability and procedures, traffic, and aircraft performance. These complicating factors and constraints often impose route inefficiencies. For example, flight plans are required to be formulated and filed 1-2 hours prior to gate departure, and are required to route conservatively around forecasted convective weather.

Because routing is both economically important and technically challenging, there remains a need, therefore, for a more efficient air traffic re-routing system.

SUMMARY

In accordance with an embodiment, the invention provides a system for providing rerouting information based, in part, on a probability of route acceptance.

In accordance with another embodiment, the invention provides a method for providing rerouting information. The method includes the steps of determining a probability of route acceptance, and providing the rerouting information base, in part, on the probability of route acceptance.

In accordance with further embodiments, the invention provides a system for providing rerouting information based, in part, on decision tree analyses involving decisions to request and decisions to not request a reroute.

BRIEF DESCRIPTION OF THE DRAWINGS

The following description may be further understood with reference to the accompanying drawings in which.

The drawings are shown for illustrative purposes only.

DETAILED DESCRIPTION

Applicant has developed an advanced routing decision support tool for NAS operators (SmartRoutes™ routing decision support tool). The SmartRoutes™ tool is related to the NASA Dynamic Weather Routing (DWR) tool, with numerous significant additional advanced capabilities. One capability that routing tools such as DWR lack is higher-level, route optimization, decision support. Route design tools such as DWR may produce multiple routing options for a given flight, but they do not provide users with an optimization strategy for using those routes.

Figure 1:
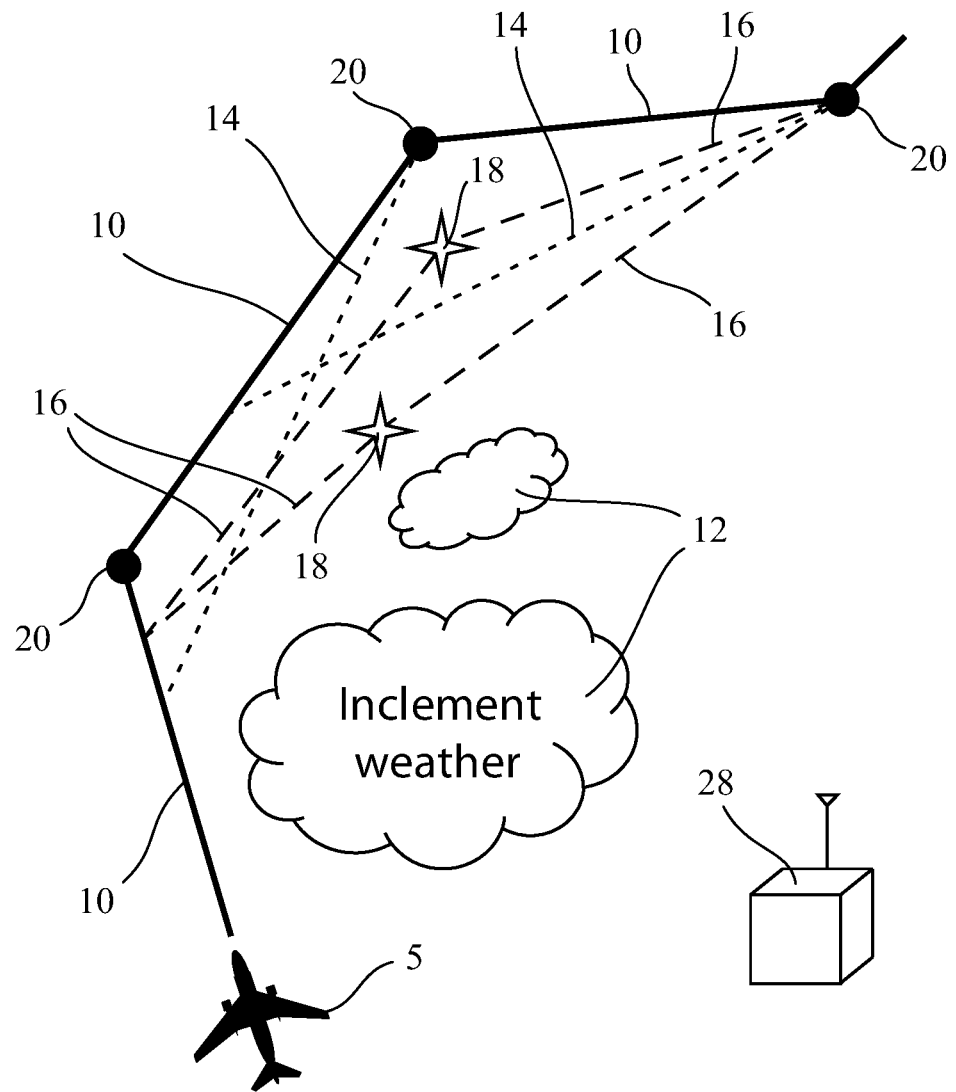
FIG. 1 shows an illustrative diagrammatic view of a notional diagram of types of reroutes in accordance with an embodiment of the present invention.

Tools such as DWR are capable of identifying multiple candidate reroutes for a given flight, for example, within an Air Route Traffic Control Center (ARTCC). As FIG. 1 (which shows a notational diagram of types of reroutes) illustrates, the reroutes may be direct to a downstream point or they may be multi-leg, they may initiate at the same or different points, and they may rejoin, or capture, the flight plan at the same of different points. In particular, FIG. 1 shows a planned route 10 for an aircraft 5 with flight plan fixed locations 20, which bypasses inclement weather 12. Direct-to reroutes 14 provide direct reroutes to certain fixed locations 20, while multi-leg reroutes 16 provide routes to fixed locations 20 via auxiliary waypoints 18 as shown.

The invention provides a reroute optimizer system (SmartRoutes') using one or more processing systems 28, which provides a new, novel, and important method for optimizing civil transport reroute technology. The concept includes six primary innovations, including a decision-making method for optimizing a flight's rerouting strategy, a method for modeling and predicting the operational acceptability of a reroute, a method for modeling and including the true, nonlinear, user cost of delay, a method for conducting air-ground negotiations via data-link, a method for optimizing across multiple flights, and a method for deciding when and how to convert time savings to additional fuel savings in accordance with various embodiments.

Tools such as DWR are designed to select the first available reroute that exceeds a preset savings threshold. While this may be the best strategy in some scenarios, it does impose an opportunity cost, as it may preclude other downstream candidate reroutes in the ARTCC (i.e., if they temporally overlap), or more complex rerouting and negotiation strategies. For example, if an overlapping downstream reroute has a significantly higher savings, and/or operator acceptability, compared to an immediate reroute, then the opportunity cost of selecting the first threshold-exceeding reroute may be too high. On the other hand, the upstream reroute enjoys the advantage of having the downstream reroute as a fallback plan if the first reroute is operationally rejected. In essence, it has two tries at enacting a reroute. An example of this scenario may occur when a flight is nearing an ARTCC boundary and thus will have longer reroutes available to it. What is needed is a principled, objective method for optimally selecting which reroutes to use. The following sections describe approaches of various embodiments of the invention to this problem.

Tools such as DWR produce relatively accurate estimates of the flight time savings for each candidate reroute it generates. Different reroutes, however, may have significantly different chances of operational acceptance. A candidate reroute may be rejected at the airline dispatch, flight deck, or ATC levels, for a variety of reasons. The different reasons are discussed herein in which they are modelled and used to estimate the overall probability of route acceptance. This probability allows the system to compute the expected savings for a given reroute candidate in accordance with an embodiment as:

$$E(S) = P_\alpha \times S\_DWR \quad (1)$$

where $P_\alpha$ is the probability of acceptance, S is the flight time savings, S_DWR is the flight time savings as estimated by DWR, and E(S) is the expected value of the flight time savings.

Figure 2:
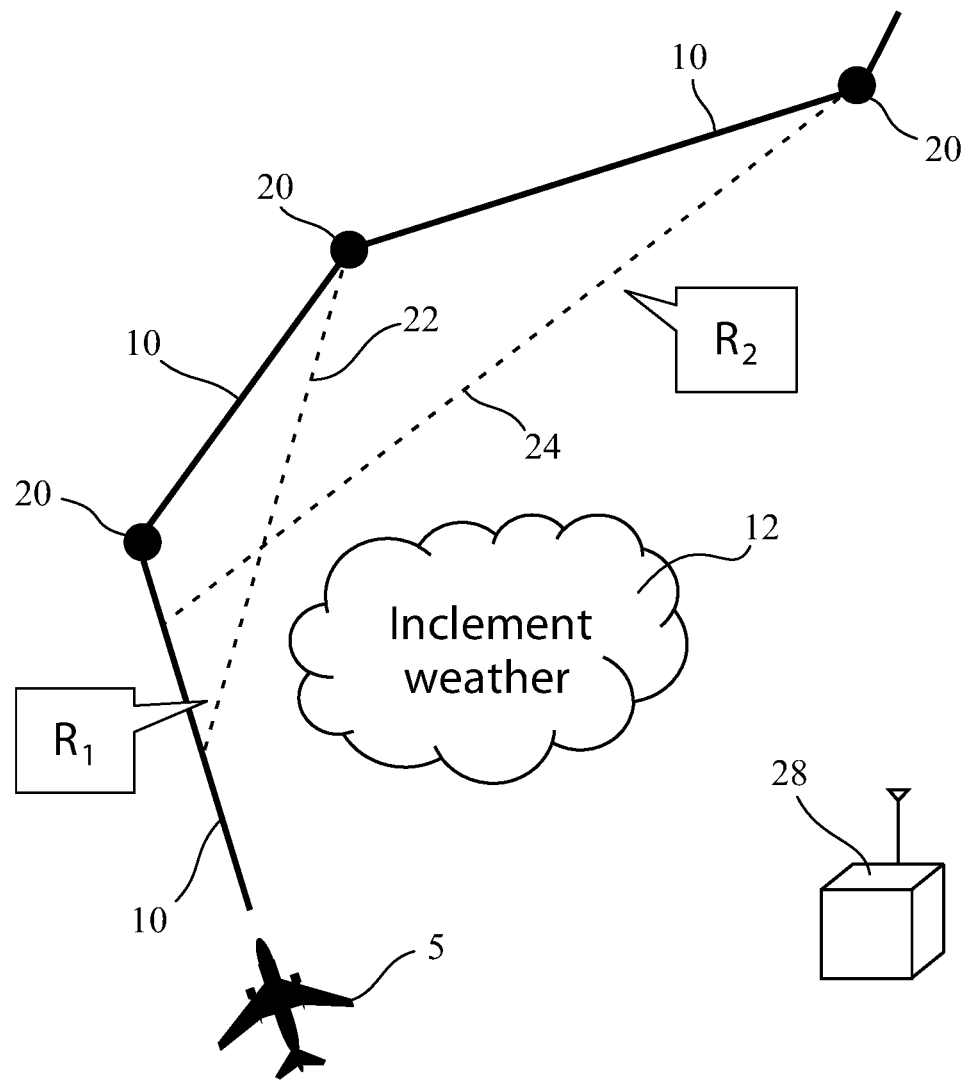
FIG. 2 shows an illustrative diagrammatic view of a notional diagram showing two potential reroutes in accordance with an embodiment of the present invention.

Now consider the case of two, candidate reroutes, $R_1$ and $R_2$, with savings $S_1$ and $S_2$, respectively, which cannot both be executed, as illustrated in FIG. 2, which shows a two re-route case, with a first reroute 22 and a second reroute 24 from the planned route 10 that includes fixed locations 20 and which bypasses inclement weather 12.

Initially consider the case of a common acceptability probability, $P_\alpha$. Consider two candidate actions, Action$_1$ and Action$_2$, which select $R_1$ and $R_2$, respectively. For each action, the expected savings may be derived. For Action$_1$, assume that if $R_1$ is operationally rejected, then $R_2$ will be attempted. Therefore, the expected savings of Action$_1$ is a linear combination of the savings of the two reroutes multiplied by the probability they are flown:

$$E(S\_Action_1) = P_\alpha \times S\_DWR_1 + (1-P_\alpha) P_\alpha \times S\_DWR_2 \quad (2)$$

where S_DWR$_1$ is the flight time savings of $R_1$ as estimated by DWR, and S_DWR$_2$ is the flight time savings of $R_2$ as estimated by DWR. From Eq. (1), the Action$_2$ expected savings is:

$$E(S\_Action_2) = P_\alpha \times S\_DWR_2 \quad (3)$$

Consider a user whose objective is to maximize the expected savings of the reroute actions. The expected value of Action$_2$ is subtracted from that of Action$_1$. If this expression is positive, then Action$_1$ is indicated (i.e., its expected value is greater than that of Action$_2$).

$$E(S\_Action_1) - E(S\_Action_2) = P_\alpha \times S\_DWR_1 + (1-P_\alpha) P_\alpha \times S\_DWR_2 - P_\alpha \times S\_DWR_2$$

$$P_\alpha \times S\_DWR_1 + (1-P_\alpha) P_\alpha \times S\_DWR_2 - P_\alpha \times S\_DWR_2 > 0$$

$$S\_DWR_1 + (1-P_\alpha) \times S\_DWR_2 - S\_DWR_2 > 0$$

$$S\_DWR_1 - P_\alpha \times S\_DWR_2 > 0$$

$$S\_DWR_1 > P_\alpha \times S\_DWR_2 \quad (4)$$

Therefore, in the two-reroute case with a common probability of acceptance, Action$_1$ is indicated if the savings of $R_1$ exceeds the savings or $R_2$ multiplied by the probability of acceptance; otherwise, Action$_2$ is indicated. Or in other words, Action$_2$ is selected only if the savings of $R_2$ is sufficiently higher than that of $R_1$ to offset the advantage that Action$_1$ has of having $R_2$ as a fallback plan if $R_1$ is rejected.

If the probability of acceptance is different for $R_1$ and $R_2$, then the decision derivation is slightly more complicated. Initially, generalize Eq. (2):

$$E(S\_Action_1) = P_{\alpha 1} \times S\_DWR_1 + (1-P_{\alpha 1}) P_{\alpha 2} \times S\_DWR_2 \quad (5)$$

where $P_{\alpha 1}$ is the probability of acceptance of $R_1$, and $P_{\alpha 2}$ is the probability of acceptance of $R_2$. It then follows that:

$$E(S\_Action_1) - E(S\_Action_2) = P_{\alpha 1} \times S\_DWR_1 + (1-P_{\alpha 1}) P_{\alpha 2} \times S\_DWR_2 - P_{\alpha 2} \times S\_DWR_2$$

Again set the expression greater than zero to test for the conditions when Action$_1$ is indicated.

$$P_{\alpha 1} \times S\_DWR_1 + (1-P_{\alpha 1}) P_{\alpha 2} \times S\_DWR_2 - P_{\alpha 2} \times S_{DWR_2} > 0 \quad (6)$$

$$\frac{P_{\alpha 1}}{P_{\alpha 2}} S\_DWR_1 + (1-P_{\alpha 1}) S\_DWR_2 - S_{DWR_2} > 0$$

$$\frac{P_{\alpha 1}}{P_{\alpha 2}} S\_DWR_1 - P_{\alpha 1} \times S\_DWR_2 > 0$$

$$S\_DWR_1 > P_{\alpha 2} \times S\_DWR_2$$

In this case $P_{\alpha 2}$ becomes the critical probability. Action$_1$ is indicated if the savings of $R_1$ exceeds the savings or $R_2$ multiplied by the probability of acceptance of $R_2$. Equation (6) provides an objective decision-making criterion in this two reroute case, when the objective is to maximize the expected savings. This highlights the importance of estimating the probability of route acceptance as discussed further below.

The probability of route acceptance may be determined as follows. The primary influences on route acceptance or rejection, by operators at the airline dispatch, flight deck, and Air Traffic Control (ATC) levels are discussed as follows. These influences include: Reroute complexity, Controller workload, Route historical frequency of use, and Constraint proximity.

Each of these factors may be quantitatively modeled, and used in an overall estimate of the probability of route acceptance. Field data (SmartRoutes™ field data) may be used in a machine learning approach to fine-tune the model.

Reroute complexity may be analyzed as follows. Any candidate reroute must be evaluated and communicated by the airline dispatcher, flight crew, and air traffic controller. Therefore, as the complexity of the reroute increases, the chances of rejection, at any of these stages, increases. The route complexity, RC, may be modeled as the number of fixes and/or jet routes comprising the reroute.

A key factor in ATC acceptability of a reroute request is the controller workload. Controller workload may be modelled using current or expected traffic and weather metrics, including: the traffic loading in an airspace sector relative to the nominal sector capacity; the presence of convective weather, modeled as the fraction of the sector area with Corridor Integrated Weather System (CIWS) level three or higher (Vertically Integrated Liquid (VIL)3+) and with echo tops above the sector altitude floor, traffic entry and exit events in the sector over some time period, the number of climbing or descending flights in the sector vs. the number of level flights, aircraft reroutes that clip the sector or Center corner, resulting in relatively short flight time within the sector or Center and therefore short time between hand-offs, and aircraft reroutes that run along a sector or Center boundary requiring complicated coordination between controllers. Controller workload can vary substantially, and therefore impact the reroute selection. Field data is analyzed to determine the best functional form and fit to estimate the controller workload, CW.

Another factor in the ATC acceptability of a reroute request is the historical use of the route. Reroutes using obscure or rarely used routes are less likely to be accepted than reroutes using familiar, commonly-used routes. Historical surveillance and flight plan data is mined to build a database of common routes. The route legs and combination or route legs are flown is determined, and their frequency of use, in terms of number of flights which flew each leg or combination of legs, per month of historical data.

This data is used to assign an overall route frequency metric, RF, for each candidate reroute. The metric RF is the mean frequency value of the route, taken over the legs comprising the route. Reroute tools such as DWR do not produce suggested reroutes that enter closed airspace, transit heavy convective weather, or otherwise violate known constraints. Nonetheless, reroutes may have close proximity to constraints, and these can affect the operational acceptability, particularly at the dispatch and flight deck stages.

Therefore, a constraint proximity metric, CP, is created, which is the horizontal range from the aircraft to the nearest constraint, at point of closest approach (PCA). The metric CP is a measure of the separation from constraints, including: currently closed airspace, heavy convective weather, and whether upwind or downwind from the convection, and traffic. For convective weather, the CIWS VIL3+ is used to represent heavy convective weather. Forecasted movement of the weather and traffic is accounted for when computing the PCA. Pilots typically require greater separation when passing on the downwind side of convection, compared to the upwind side, which is accounted for in the CP metric.

Figure 3:
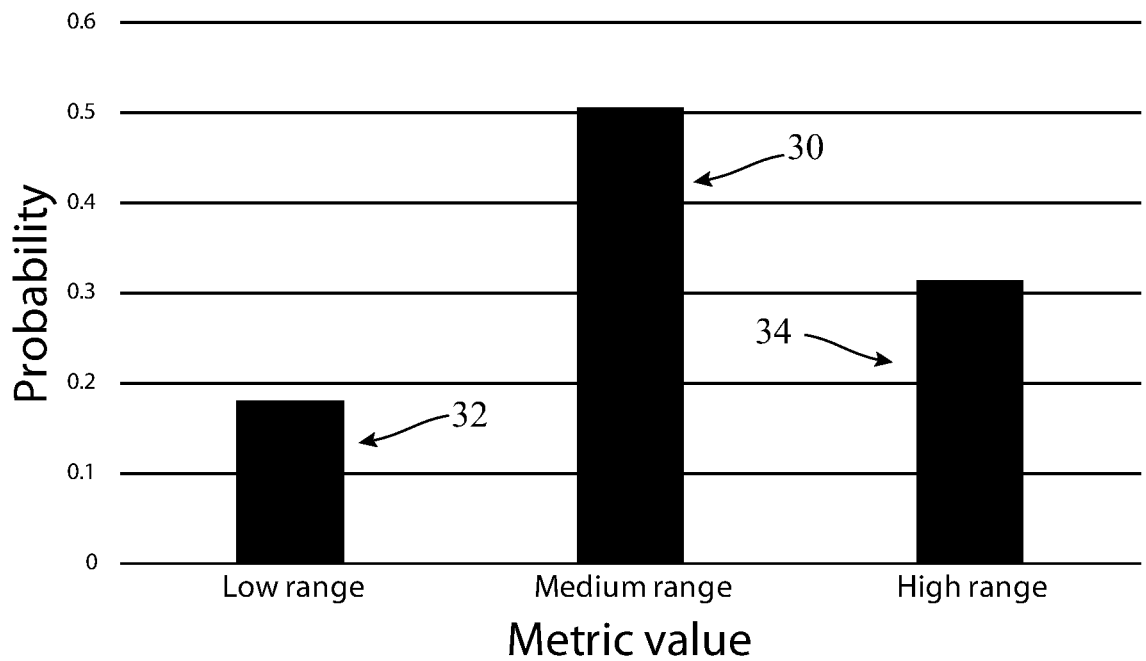
FIG. 3 shows an illustrative diagrammatic graphical representation of a notional probability distribution for a single reroute acceptance metric in accordance with an embodiment of the present invention.

The four factors described above (i.e., reroute complexity, controller workload, route frequency of use, and constraint proximity) are combined to predict the probability of acceptance, for a candidate reroute. The process begins by using field data to determine the relative frequency that a reroute is accepted. This is used as an estimate of the probability of reroute acceptance, P(A). Categories are next created (e.g., low, medium, and high) for each of the four metrics, RC, CW, RF, CP. Field data is again used to determine the relative frequencies of each category, and use these to estimate the probability distribution of each metric, as illustrated in FIG. 3 (which shows Notional probability distribution for a single reroute acceptance metric). In particular, FIG. 3 shows at 30 that a metric value in a medium range has a higher probability of acceptance as compared to a low range metric value (shown at 32) or a high range metric value (shown at 34).

Similarly, the conditional probabilities, $P(RC_i|A)$, $P(CW_i|A)$, $P(RF_i|A)$, and $P(CP_i|A)$ are estimated, where the subscript i denotes the categories of each metric. For example, if a metric has three categories, then three conditional probabilities are computed, indicating the probability for each category of the metric, given that the reroute is accepted. (Note that this is equivalent to re-creating the FIG. 3 distribution, but basing it not on all reroutes, but only on reroutes that were accepted).

Given the probability of reroute acceptance, P(A), the probability distribution of each category, and the conditional probabilities, $P(RC_i|A)$, $P(CW_i|A)$, $P(RF_i|A)$, and $P(CP_i|A)$, the probability of acceptance, P(A) can now be updated, for a given candidate reroute. In other words, the probability of reroute acceptance from above, P(A), was computed over all reroutes in the field data. The system may now update this estimate for a given candidate reroute, given the value of its four metrics, RC, CW, RF, CP. This may be done using Bayes' Theorem:

$$P(A|M_i) = \frac{P(M_i|A)}{P(M_i)} P(A) \quad (7)$$

Where $M_i$ represents the i-th category of reroute acceptance metric M. Equation (7) is repeated for each of the four reroute acceptance metric values. At each iteration, the left-hand side is used as the prior probability in the subsequent iteration. That is, the new P(A) value is set equal to $P(A|M_i)$, so $P(A|M_i) \rightarrow P(A)$.

When the four iterations are complete, the result is an estimate of the probability of reroute acceptance, P(A), accounting for the four metric values, for that particular reroute candidate. This is a crucial value, and this quantitative, systematic evaluation of it is a new innovation.

The above considered the canonical two-reroute case (i.e., the problem of selecting a strategy when two reroutes are available). The system may make use of those canonical results discussed above, which examine the problem of selecting single, and multiple reroutes, respectively, from a set of N candidate reroutes produced by a tool such as DWR. As before, in these sections, it is assumed that the user objective is to maximize the expected reroute savings, E(S).

Figure 4A:
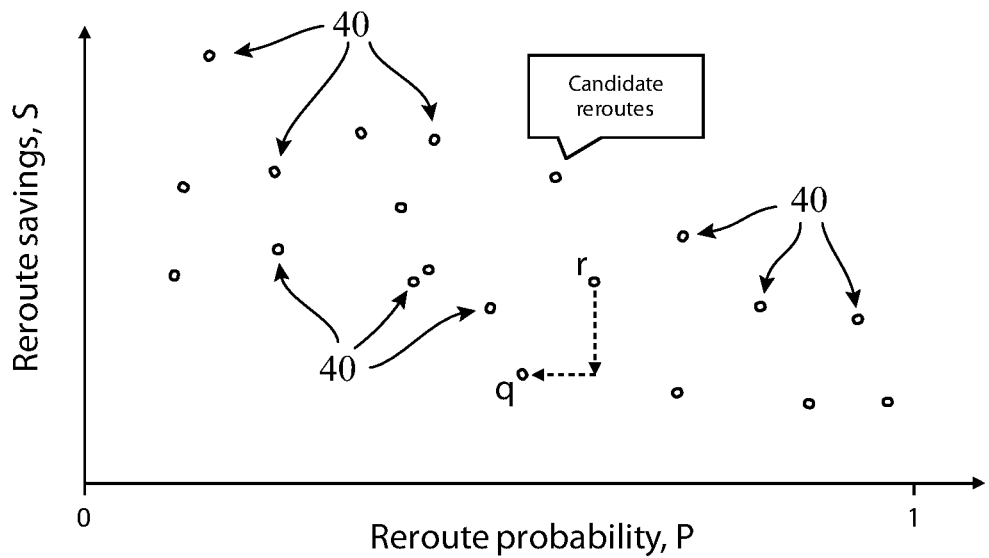
FIG. 4A shows an illustrative diagrammatic graphical representation of candidate reroutes distributed by reroute probability and reroute savings in accordance with an embodiment of the present invention.

For a given candidate reroute, the expected savings E(S) is the product of the probability of the reroute, and its savings. It is useful to visualize the candidate reroutes, for a given ARTCC, in the probability-savings (P-S) space, as FIG. 4A illustrates, which shows a notional diagram of the probability-savings space, with example reroutes r and q. In particular, FIG. 4A shows at 40 candidate reroutes distributed by reroute probability, P, and reroute savings, S.

Because the reroute probability factors, discussed above, tend to favor shorter routes, the general trend in the P-S space is reduced savings with increasing probability, as FIG.

4B discussed below illustrates. Of course high-savings reroutes, with high probability, are consistently discovered as well.

Before finding the maximum E(S) reroute, it is noted that for the maximum E(S) objective, any reroute in the P-S space which has both a lower probability and a lower savings, relative to any other reroute in the space (such as reroute q in relation to reroute r in FIG. 4A), will not be used in the solution. This is because a point with higher probability and higher savings necessarily has a higher E(S).

Figure 4B:
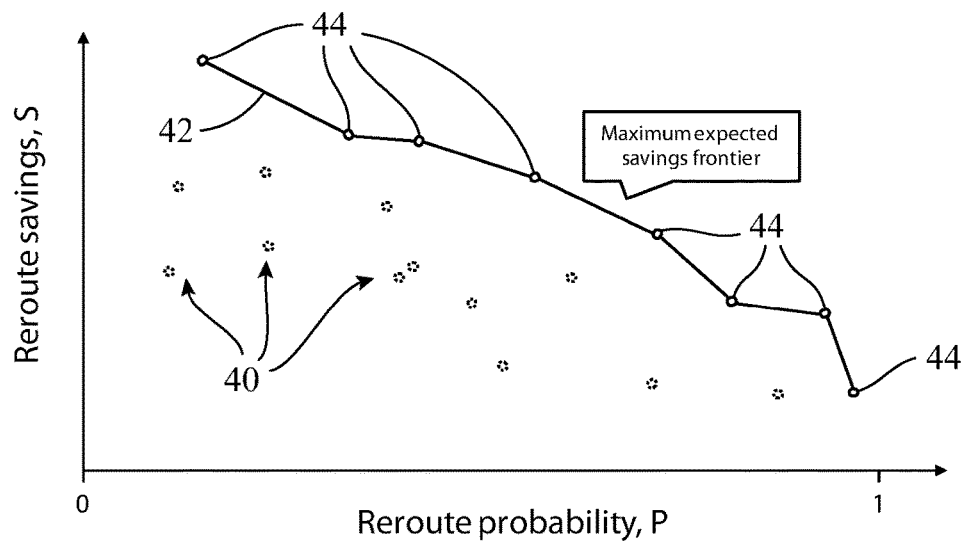
FIG. 4B shows an illustrative diagrammatic graphical representation of a maximum expected savings (E(S)) frontier in accordance with an embodiment of the present invention.

This suggests the concept of a maximum E(S) frontier, consisting of only those points in the P-S space for which there is no other point with both higher probability and higher savings. This is illustrated in FIG. 4B (which shows a notional diagram of the maximum E(S) frontier). In particular, FIG. 4B shows at 42 a maximum E(S) frontier 42 that connects points 44 having both higher probability and higher savings of the candidate reroutes 40 of FIG. 4A. For the single reroute case, the maximum E(S) is simply the point in the frontier with the maximum product of P and S. Before examining this solution, however, the cost of time is considered.

Thus far it has been assumed that the reroute savings, S, are directly proportional to the reroute flight time reduction. But the true value of S is typically more complicated, depending on the user business case. For example, if a flight is currently 16 minutes delayed, then the first few minutes of delay reduction are far more valuable (in order to move the ETA within the A14 threshold, which refers to the 14-minute arrival delay threshold used by the Department of Transportation to accrue on-time statistics), than additional delay reduction.

Figure 4C:
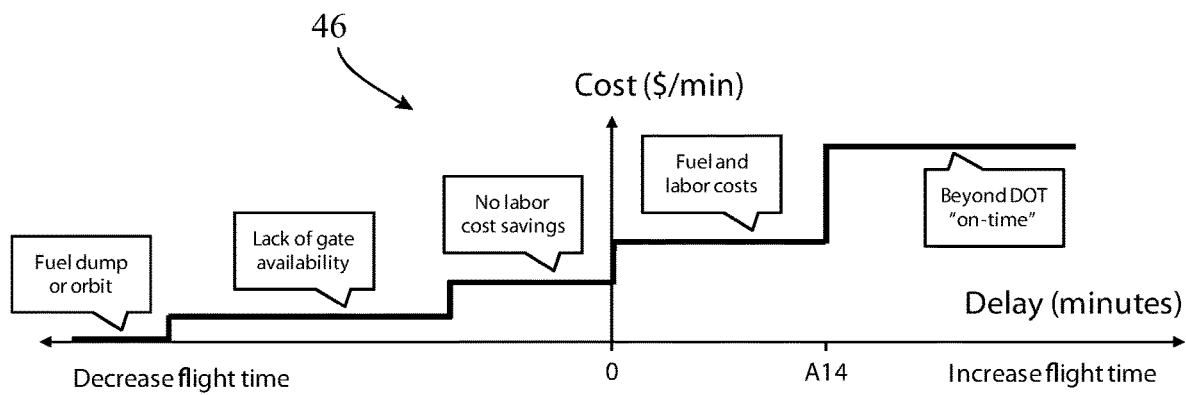
FIG. 4C shows an illustrative diagrammatic view of a notational diagram of a cost of flight delay relative a scheduled flight time in accordance with an embodiment of the present invention.

On the other hand, if the flight was delayed even more, say 25 minutes, then a large negative delay of 11 minutes would be of disproportionately greater value, than shorter delay reductions which would not reach A14. The A14 threshold is one of many cost components that contribute to the overall cost of delay borne by the operator. FIG. 4C (which shows a notional diagram of the cost of flight delay relative to the scheduled flight time) illustrates several other cost components and considerations, and a resulting, notional, cost of delay profile (as a function of delay). In particular, FIG. 4C shows at 46 that cost and flight time increase together due to many factors, including (and increasing both cost and delay), fuel dump or orbit, lack of gate availability, actions associated with no labor cost savings, fuel and labor costs, and time delays beyond Department of Transportation (DOT) delays considered on-time (e.g., 14 min).

In addition to the FIG. 4C cost components, user business cases can include several other factors that complicate the value of negative delay. For example, the value profile of the delay cost varies substantially between a flight that is inbound to a hub in an arrival rush, and with a short gate turn around, compared to a night flight that is outbound from a hub. Another complicating factor is the number of passengers with short connections, and the presence of VIPs on board a flight.

A cost profile is created, based on scheduling and hub information for the flight. But it allow users to replace it with their own profile. Either way, the system uses the value profile of delay to transform S, of any given candidate reroute, to the user's true savings, S', which accounts for the various business case factors. This sometimes will have the effect of making the shorter reroutes with smaller savings more competitive, when a short savings is highly needed. For other flights a larger time savings is needed, so the longer reroutes have inflated savings. In any case, the user objective is assumed to be to maximize the expected value of the transformed savings, E(S').

Consider the problem of selecting a single reroute from two candidate reroutes, $R_1$ and $R_2$. $R_1$ has a savings of 8 minutes with acceptance probability of 0.5. $R_2$ has a savings of 4 minutes with acceptance probability of 0.75. By Eq. (1), $R_1$ is indicated as it has an expected time savings of 4 minutes whereas R2 has an expected time savings of only 3 minutes.

Now consider this scenario, with a flight which currently is behind schedule by 18 minutes, with a cost of delay setting of $400/minute for the first four minutes of negative delay (achieving A14), and after that $100/minute of negative delay. Now, from Eq. (1), E(S') for $R_1$ is $$E(S')=P_\alpha \times S\_DWR$$

$$E(S')=0.5\times(4\times\$400+4\times\$100)=\$1,000$$

On the other hand, E(S') for $R_2$ is $$E(S')=0.75\times(4\times\$400)=\$1,200$$

Therefore, $R_2$ is indicated when the current delay and the cost of delay profile are considered. In this example the reroute with lower E(S) has the higher E(S') by virtue of the scenario specifics.

Figure 4D:
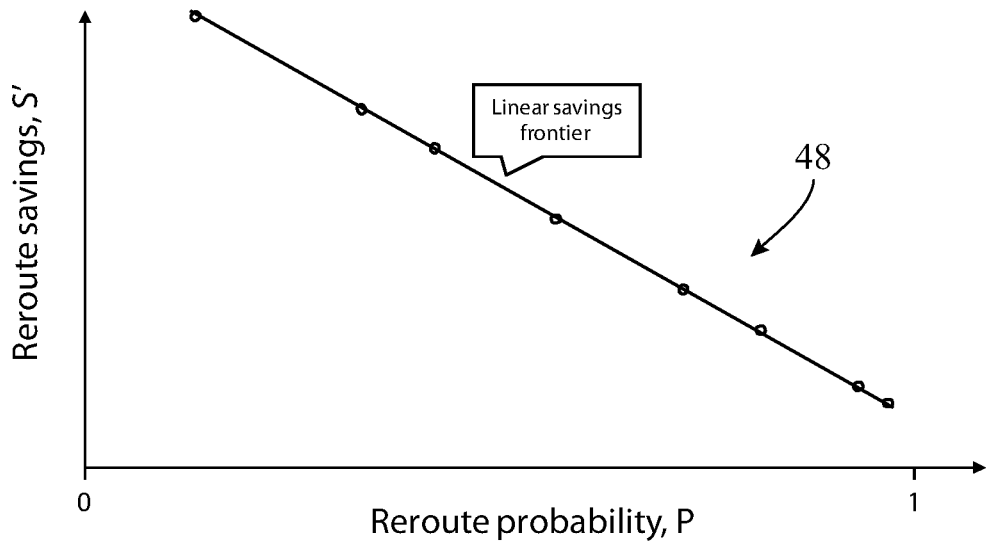
FIG. 4D shows an illustrative diagrammatic graphical representation of a notional diagram of a linear maximum (E(S)) frontier in accordance with an embodiment of the present invention.

It is also worth considering the functional example where the E(S') is linear in the P-S' space, as illustrated in FIG. 4D, which shows a notional diagram of a linear maximum E(S') frontier. In particular, FIG. 4D shows at 48 the linear savings frontier regarding reroute probability, P, and reroute savings, S'. For the FIG. 4D case, the linear maximum E(S') frontier can be expressed as:

$$S'=mP+b \qquad (8)$$

where m is the slope and b is the y-intercept of the linear function. From Eq. (1), E(S') is then Eq. (8) multiplied by the abscissa, P, yielding the quadratic:

$$E(S')=mP^2+bP \qquad (9)$$

To optimize the expected value of the transformed savings, the derivative of Eq. (9) is set to zero, and solved for P:

$$0 = 2mP + b \qquad (10)$$

$$P = \frac{-b}{2m} \qquad (11)$$

But when S' near probability of one (right side of FIG. 4D) is small, then m≈−b, leading to a probability of one-half:

$$P \approx \frac{1}{2} \qquad (12)$$

In other words, for the canonical case of a linear savings frontier leading to a small savings at unity probability, the reroute that maximizes the expected transformed savings has a probability of acceptance of 0.5. In practice, the expected savings may be numerically computed for each frontier point, E(S')=PS', and the maximum may be chosen.

The above discusses single-reroute selection, but reroutes can be rejected for reasons outlined above. The possibility of rejection raises the question of follow-up reroute requests, such as in the two-reroute approach. The two-reroute approach is attractive because it provides for higher E(S') than the one-reroute approach.

Follow-up reroute requests also support future automated air-ground negotiation capabilities. Below focus on the two-reroute case (see Eq. 5), and accompanying text discusses the N-reroute case that may occur in automated air-ground negotiation. The above presented the probability of two-route acceptance model. In the two-reroute case, the selection of the first reroute impacts the feasibility and acceptance of the second reroute, depending on the relative timing. Therefore, three time windows are defined: prior, settling and post settling. The prior time is the time prior to the initiation of the first reroute. The settling time is an operational settling time window, after the initiation time of the first reroute. This may be very short. Possibly the biggest factor is related to whether or not the same sector controller has track control of the aircraft. In other words, this is related to a "Hey, I just gave you a short cut" factor. Possibly the settling window has more to do with time to next sector hand-off. The post settling time is the time after the operational settling time window.

For a given first reroute, all other reroutes that initiate in the first time window are, obviously, not feasible as candidates for the follow-up, second reroute, in case the first reroute is rejected. For the second time window, the operational settling time is defined as the time period in which a second reroute request is not operationally feasible because insufficient time has passed since the first reroute was rejected (note that the second time window may be relatively short and likely will shift at sector crossings).

Therefore, reroutes that initiate in the second time window are, also, not feasible as candidates for the follow-up, second reroute. Only reroutes that initiate in the third time window are left as feasible candidates for the second reroute. The point here is that the initiation time of the first reroute impacts the set of candidate reroutes available for the second request, if the first request is rejected. Therefore, an otherwise desirable reroute that occurs late in time, may be a sub optimal choice for the first reroute if its late timing eliminates other attractive reroutes from consideration. This raises the general question of how to select the optimal two-reroute pair, which is next considered.

In the two-reroute selection case, given a candidate for the first reroute, for the second reroute the system may immediately eliminate all reroutes that initiate in the prior and settling time windows. After eliminating these unfeasible routes, it follows from Eq. (5) that the optimal second route to select will always be that with the highest E(S') of the remaining reroutes. Therefore, using Eq. (5), the combinations that need to be exhaustively tested are every reroute on the savings frontier as the first reroute, followed by the highest E(S') reroute of the remaining feasible reroutes, for the second reroute.

Using Eq. (5), the maximum E(S') gives the optimal two-reroute strategy. Note that the highest E(S') reroute is not necessarily the first reroute in the optimum two-reroute strategy. But if it is not, the first reroute must be temporally prior to the highest E(S') reroute. Any temporally later reroute, taken as the first reroute of the set, cannot yield the highest expected savings, because it cannot have any superior reroutes as the second of the set, compared to what are available to the highest E(S') reroute.

Figure 5:
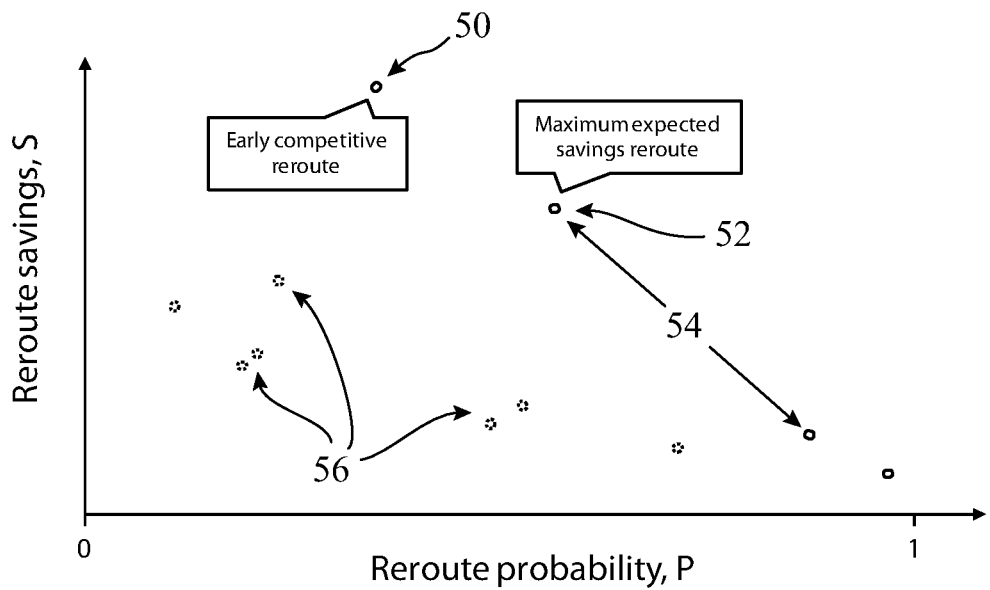
FIG. 5 shows an illustrative diagrammatic graphical representation of an example of optimum single reroute as a second reroute in optimum two-reroute strategy.

As an example of how the highest E(S') reroute may be the second reroute in the optimal two-reroute strategy, consider a temporally early, competitive reroute, that occurs prior to the highest E(S') reroute, as illustrated in FIG. 5, which shows an example of optimum single-reroute as second reroute in optimum two-reroute strategy. In particular, FIG. 5 shows an early competitive reroute 50 as well as a maximum expected savings reroute 52 from a set of frontier points 54 of a plurality of candidate reroutes 56. If the candidate reroutes temporally later than the highest E(S') reroute are of low savings, then the optimal two-reroute strategy will consist of the earlier, competitive, reroute followed by the highest E(S') reroute.

In accordance with further embodiments, systematic use of air-ground datalinks may be employed, such as controller-pilot data link communications (CPDLC), which will enhance in-flight rerouting. This will support more complex reroutes, reduced settling time, more reroute requests, and air-ground negotiation protocols. It will allow users to optimize their multiple reroute selection, discussed in this section. At a high-level, the system optimizes the rerouting decision by first ordering the future reroutes chronologically in future time.

For the next, upcoming candidate reroute, the system computes the two expected savings values, for the decisions to request, and not to request, the reroute. If there are ties (i.e., multiple reroutes at the same start time), then the system repeats this process for all of the candidate reroutes in the tie. For each reroute, the system identifies the highest expected savings decision (i.e., which is higher, to request or not to request the reroute?). If no reroute request is indicated across all the candidate reroutes, then the decision is not to request a reroute. Otherwise, of those reroutes indicated, the system selects the highest saving reroute.

Figure 6:
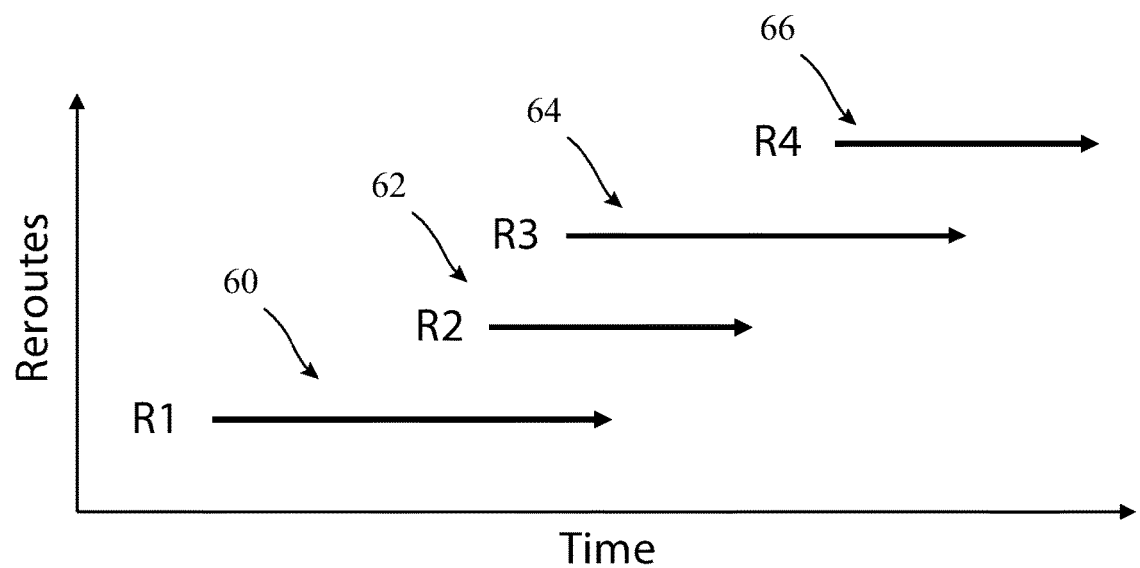
FIG. 6 shows an illustrative diagrammatic graphical representation of an example timeline of a cluster or upcoming candidate reroutes in accordance with an embodiment of the present invention.

To evaluate the request/no request decision for a given candidate reroute, the system employs the following steps. First, identify all reroutes in the upcoming cluster. For the given candidate reroute, the cluster contains all reroutes that (i) initiate at a later time than the candidate reroute initiates, and (ii) overlap temporally with the candidate reroute, or overlap with any reroute in the cluster. This means that the cluster ceases at the future time point containing no reroute (i.e., a gap). FIG. 6 (which shows an example timeline of cluster of upcoming candidate reroutes) illustrates the time spans of four reroutes forming a cluster. In particular, FIG. 6 shows a first reroute 60 that overlaps in time with a second reroute 62 as well as a third reroute 64. The second reroute 62 overlaps in time with the third reroute 64, and the third reroute 64 overlaps in time with the fourth reroute 66.

Figure 7:
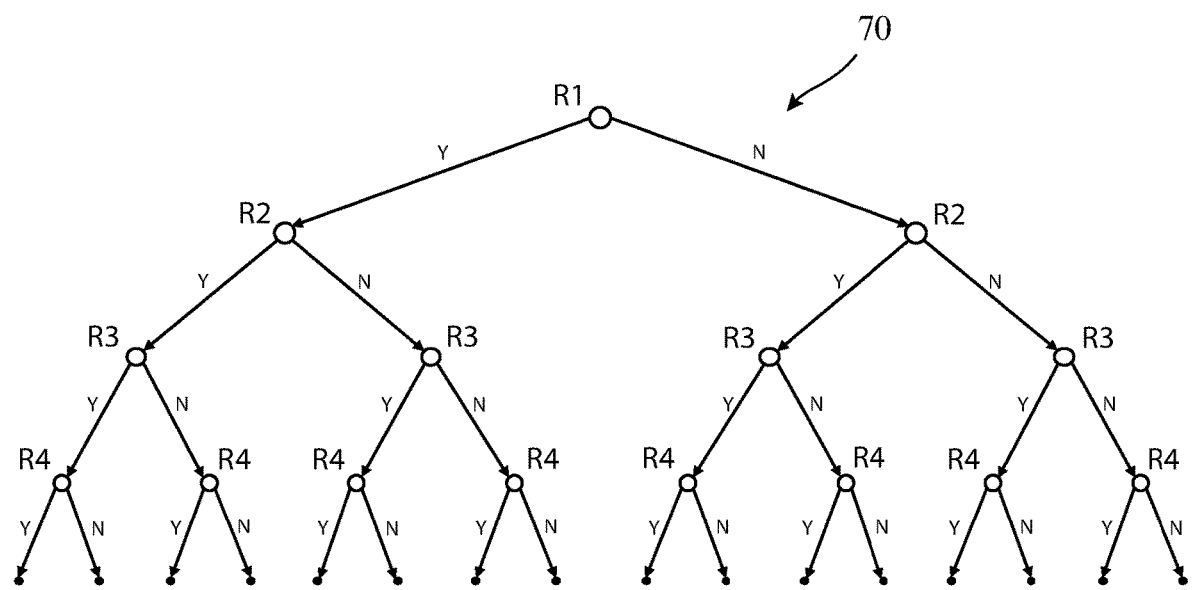
FIG. 7 shows an illustrative diagrammatic representation of a probabilistic binary decision tree for candidate reroute in accordance with an embodiment of the present invention.

The decision to be made is whether or not to request the R1 reroute. To compute the expected savings of these two options, the system next constructs a probabilistic binary decision tree, shown in FIG. 7, which shows probabilistic binary decision tree for candidate reroute R1. "Y" and "N" indicate reroutes that are or are not flown, respectively. In particular, FIG. 7 shows at 70 a probabilistic binary decision tree for candidate reroute R1, as binary decisions (Yes/No) may be made at consecutive levels regarding reroute R2, reroute R3 and reroute R4. The FIG. 7 probabilistic binary decision tree contains every possible set of rerouting events in the upcoming cluster. The cluster contains four possible reroutes, so in the binary tree there are a total of $2^4$, or 16, total reroute sequences, or paths through the tree.

Figure 8:
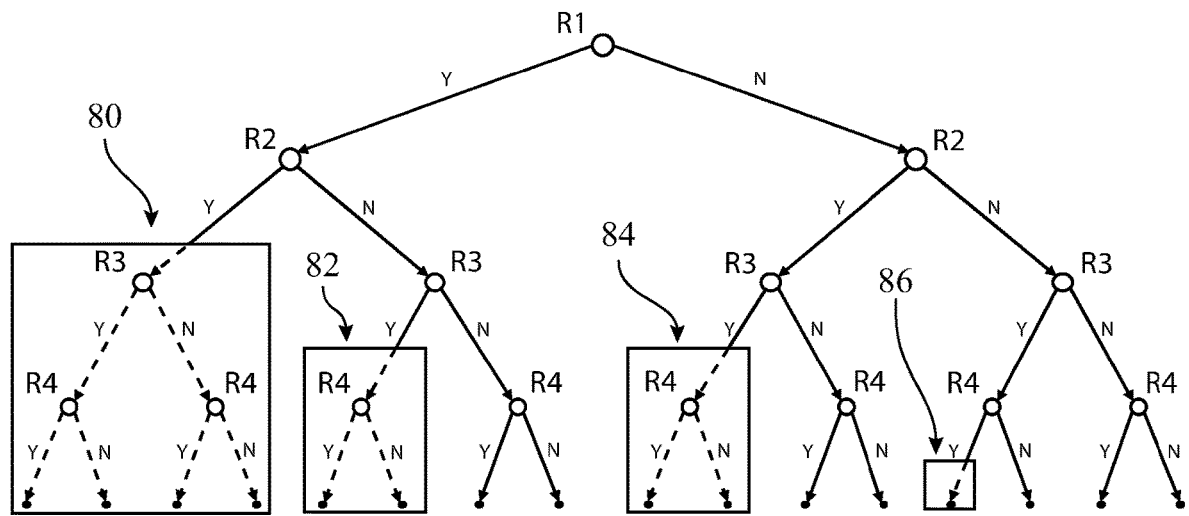
FIG. 8 shows an illustrative diagrammatic representation of the probabilistic binary decision tree for candidate reroute of FIG. 7 with certain candidate reroutes blocked out.

Not all of the paths, however, are feasible. A path is infeasible if a reroute initiation time point overlaps into an on-going reroute. For example, from FIG. 6, reroute R2 cannot be flown if reroute R1 is flown. FIG. 8 (which shows probabilistic binary decision tree for candidate reroute R1, with infeasible paths blocked out) shows the infeasible portions of the decision tree blocked out. In particular, FIG. 8 shows that certain paths of the decision tree 70 of FIG. 7 are not feasible options (such as shown at 80, 82, 84, 86 in FIG. 8) given constraints such as timing.

The blocked out portions of the FIG. 8 decision tree follow directly from the FIG. 6 timeline. For example, R2 overlaps with R1, so therefore if R1 is flown, then R2 cannot be flown (as shown blocked at 80). Similarly, R3 overlaps with R1, so if R1 is flown, then R3 also cannot be flown (as shown blocked at 84), even if R2 is not flown. By the same logic, R3 cannot be flown if R2 is flown (as shown blocked at 82), and R4 cannot be flown if R3 is flown (as shown blocked at 86). Thus the determination of which portions of the tree are infeasible is straightforward.

Figure 9:
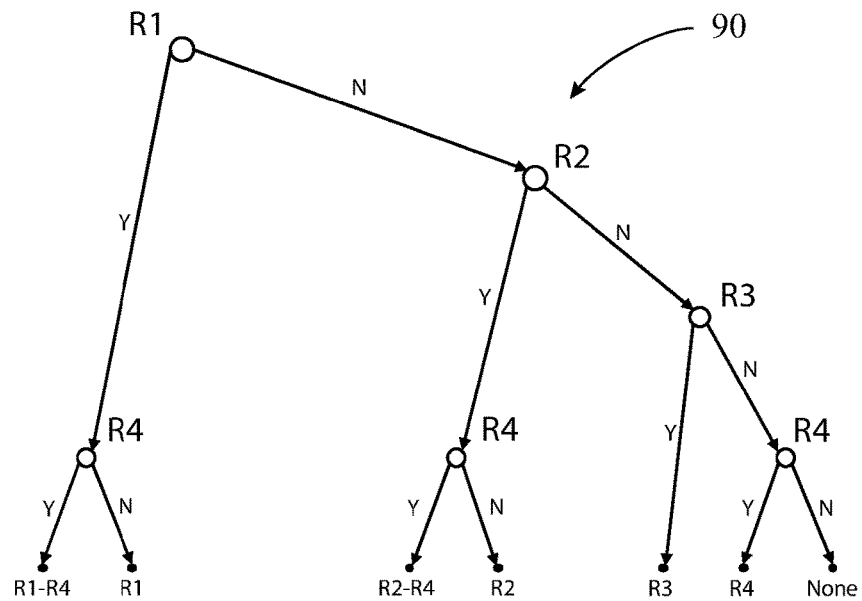
FIG. 9 shows an illustrative diagrammatic view of a fully-feasible, one-sided, probabilistic binary decision tree for requesting a particular reroute (R1) in accordance with an embodiment of the present invention.

Given the FIG. 8 designations of the infeasible portions, those portions may be removed, and the resulting nodes without a decision, leaving a fully feasible decision tree, as shown in FIG. 9, which shows fully-feasible, one-sided, probabilistic binary decision tree for requesting R1. In particular, FIG. 9 shows at 90 a probabilistic binary decision tree for candidate reroutes in which all routes are possible. Note that FIG. 9 lists, at the bottom, the reroute sequences, for each path.

The probability of acceptance in determined next, from above, for each candidate reroute. These probabilities may be attached to each node in the tree, thus making it a probabilistic tree. For example, if reroute R1 is requested, its probability of acceptance indicates the probability of the "Y" branch. One minus this probability gives the probability of the "N" branch. In this way, each segment in the tree has an associated probability.

The probabilities, however, are contingent on the reroute requests. That is, if a reroute is requested, then the probabilities of the "Y" and "N" branches are assigned as described in the above paragraph. But if a reroute is not requested, then the probabilities of the "Y" and "N" branches are 0.0 and 1.0, respectively. Therefore, the tree is a one-sided, probabilistic binary decision tree. For example, if it is decided not to request R1, then the tree is reduced, as shown in FIG. 10, which shows at 100 a fully feasible, one-sided, probabilistic binary decision tree for not requesting R1.

The expected savings may next be computed for the decision to request R1, and the decision not to request R1. This amounts to computing the expected savings for the FIGS. 9 and 10 trees, respectively, in the example.

In order to make these computations, the system needs to determine whether or not R2, R3, and R4 are requested, when those nodes in the tree are reached. For the final node in the tree (the R4 node in the example), the expected savings is always higher when the reroute is requested (i.e., there is no tradeoff). But for the earlier, interior, nodes (the R2 and R3 nodes in our example), the system will exhaust all the possible combinations of decisions, and find the sequence of decisions leading to the highest expected savings.

Figures 10, 11:
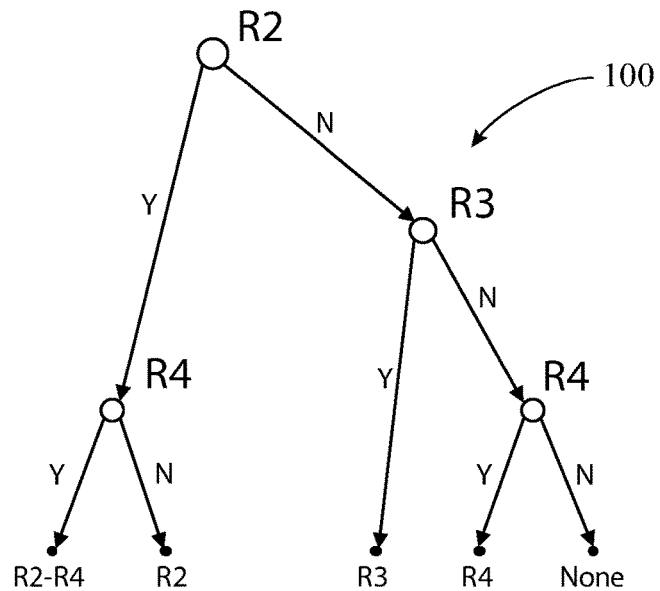
FIG. 10 shows an illustrative diagrammatic view of a fully-feasible, one-sided, probabilistic binary decision tree for not requesting a particular reroute (R1) in accordance with an embodiment of the present invention.
FIG. 11 shows an illustrative diagrammatic representation of expected cost savings calculations for decisions to request and to not request a particular reroute (R1) in accordance with an embodiment of the present invention.

FIG. 11 (which shows at 110 expected savings calculations for decisions to request, and not to request, R1) illustrates these computations for the R1 reroute decision. The top half of FIG. 11 computes the expected savings corresponding to the decision to request R1 (i.e., corresponding to the FIG. 9 tree). The bottom half of FIG. 11 computes the expected savings corresponding to the decision not to request R1 (i.e., corresponding to the FIG. 10 tree). In this FIG. 11 example calculation, it is assumed the R2 and R3 reroutes are requested when the system reaches those nodes.

In the FIG. 11 calculation, for each sequence (or path), the overall probability is computed by computing the product of the respective probabilities of the branches in the pathway. This overall probability, for each sequence or path, is listed in the middle of the figure, in the "Path" column. Hypothetical probabilities and savings (in minutes, but this could be transformed to dollars without loss of generality), for each candidate reroute, are listed at the top of the figure.

The system next computes the expected savings of each pathway by summing the savings of each reroute in the pathway, and multiplying the sum by the probability of the pathway. Finally the expected savings of the decision to request is computed, and not to request, R1, by summing the expected savings of each pathway. As FIG. 11 shows, in this example scenario, with the given probabilities and savings of each branch, the expected savings for the decision to request R1 is slightly higher (9.44 minutes) than not to request it (8.74 minutes), even though the savings of R1 is significantly lower than R3 (5 compared to 12).

As noted above, these calculations are based on the assumption that the R2 and R3 reroutes are requested when the system reaches those nodes. In order to exhaust all possible decision opportunities, the system would need to compute the expected savings under all possible R2 and R3 decision combinations: (A) R2 and R3 are requested; (B) R2 is requested and R3 is not requested; (C) R2 is not requested and R3 is requested; and (D) R2 and R3 reroutes are both not requested.

In this way, all possible decision strategies are included in the R1 decision. These four decision combinations (A, B, C, and D) are illustrated in FIGS. 12A-12D, which shows the four decision combinations that need to be evaluated. FIG. 9, and the FIG. 10 calculations, correspond to FIG. 12A.

Figure 12A:
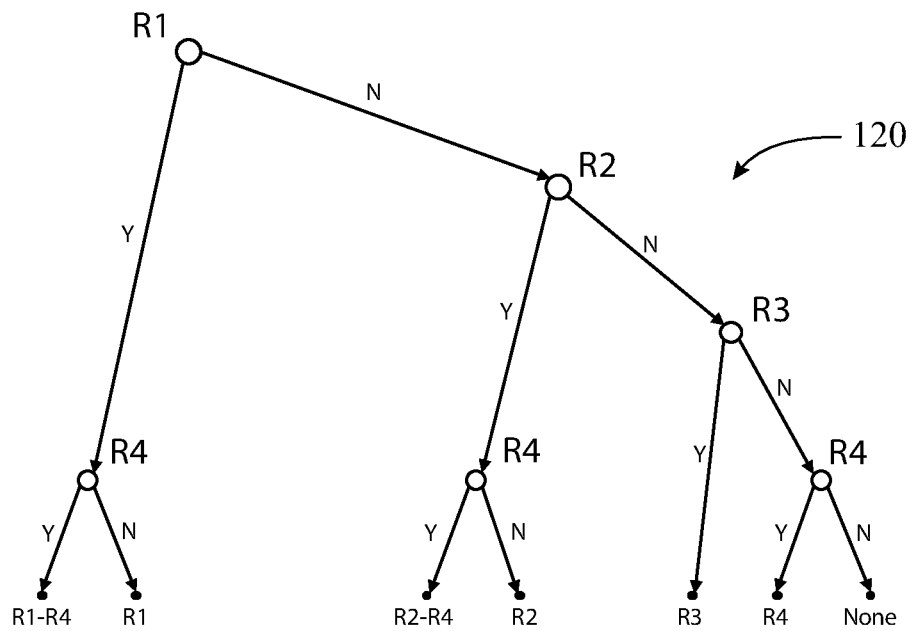
FIG. 12A-12D show an illustrative diagrammatic representations of decision combinations to be evaluation in accordance with an embodiment of the present invention.
Figure 12B:
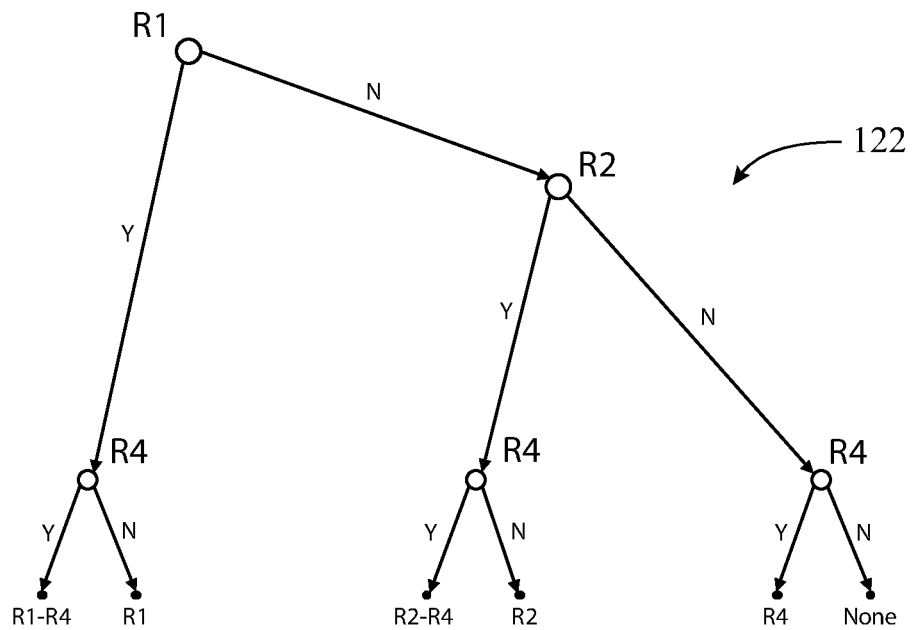
Figure 12C:
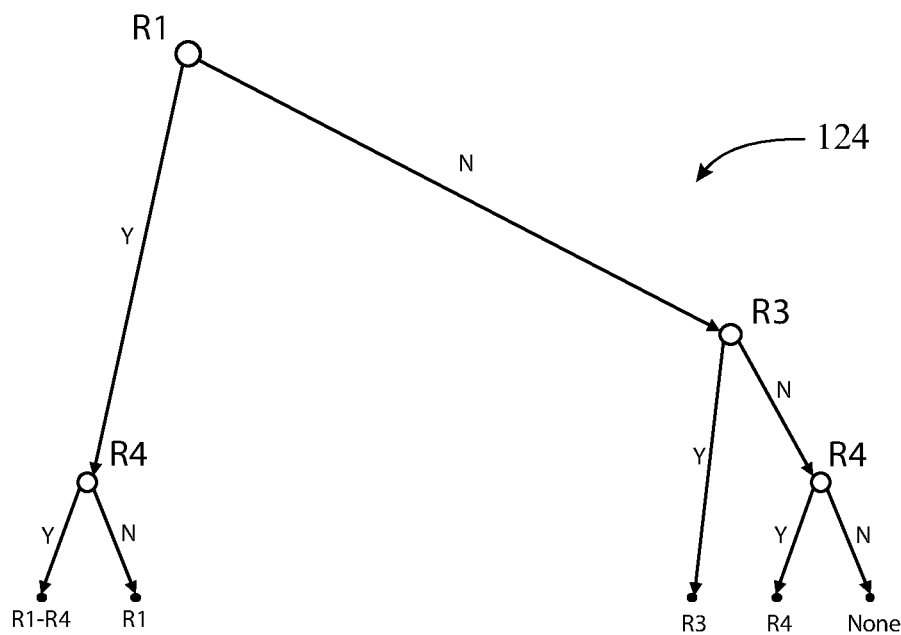
Figure 12D:
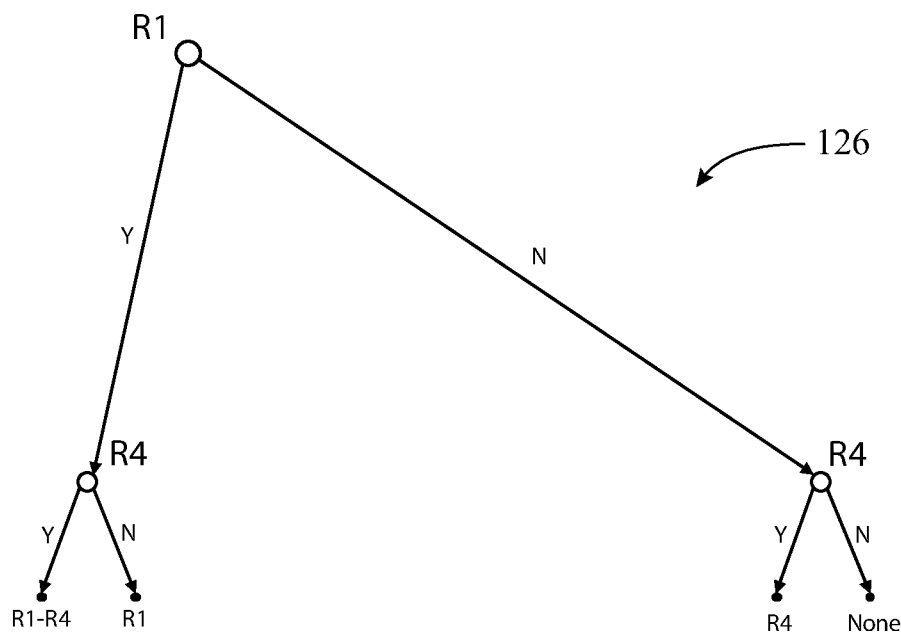

The FIG. 11 calculation is repeated for the FIG. 12B, 12C, and 12D decision strategies as shown at 120, 122, 124 and 126 respectively. This results in four expected savings values for the decision to request R1, and four expected savings values for the decision not to request R1. In order to decide whether or not to request R1, the system compares the maximum expected savings value, from each set of four values. The highest value determines the decision.

The methods presented herein support the optimization of reroute selection for a given flight. The optimal rerouting decision strategy may involve several reroute requests, and the specific sequence of requests, in general, will depend on whether or not the requests are accepted by ATC. Therefore, the strategy evolves in real-time. Furthermore, the underlying calculations, such as the probability of reroute acceptance, evolve in real-time. Such a dynamic, real-time, decision making process is particularly well supported by the emerging air-ground datalink capability, slated for implementation in the NAS in the coming years. One such example technology is CPDLC (controller-pilot data link communications).

CPDLC will enhance in-flight rerouting. It will support more complex reroutes, reduced settling time, more reroute requests, and air-ground negotiation protocols. It will allow users to optimize their multiple reroute selection, discussed in this section. These methods are summarized in the following list: (1) identify upcoming reroutes, including the earliest possible reroute, R1, and (2) identify the cluster of reroutes, associated with R1 (which identifies all the reroutes that must be considered, in determining whether or not to request R1 and in determining this decision, all other, later candidate reroutes, outside of the cluster, can be disregarded without loss of opportunity), (3) construct a binary decision tree, containing $2^N$ total reroute sequences, or paths, in the decision tree, where N is the number of candidate reroutes in the cluster, (4) identify and eliminate infeasible paths, where the sequence of reroutes is not possible due to timing overlaps, (5) given the binary decision tree consisting of feasible paths, identify all combinations of reroute decisions, (6) compute the probability of acceptance of each candidate reroute, (7) for each combination of reroute decisions, construct a probabilistic binary decision tree, (8) for each probabilistic binary decision tree, identify each possible path, or sequence of reroutes, through the tree, (9) for each path, compute the probability and expected savings, (10) for each probabilistic binary decision tree, divide the possible paths into two categories: those corresponding to requesting R1, and those corresponding to not requesting R1, (11) for each probabilistic binary decision tree, compute the overall expected savings corresponding to requesting R1, and corresponding to not requesting R1, and (12) identify the maximum savings cases corresponding to requesting R1, and corresponding to not requesting R1. If the higher of these two values corresponds to requesting R1, then this is the recommended decision, regarding R1. Otherwise, the recommended decision is not to request R1.

Further, the reroute decision problem for users with multiple flights in an ARTCC, and the problem of the problem of savings distribution between time and fuel, may be reviewed as follows. Airlines with multiple flights in an ARTCC face a potentially more complicated rerouting decision. This is because the rerouting decisions for different flights may not be independent, but instead may affect each other. For example, the rerouting of one flight may impact the controller workload, and therefore the probability of acceptance, of a rerouting request by a second flight.

Therefore, to optimize the savings across the fleet of aircraft in an ARTCC, user organizations such as airlines need to consider all possible combinations of reroutes across multiple flights. This is done by expanding the cluster (as discussed above) to include all flights in the ARTCC. The procedure is similar to that described above, except that single reroutes from different flights can overlap (i.e., they can occur simultaneously).

As described above, the reroute decision making strategy developed here assumes the user objective is to maximize the expected reroute savings, E(S). This, however, leaves unanswered the question of how to distribute the savings between time and fuel. That is, a reroute that nominally saves flight time (by virtue of reducing the distance flown and/or reducing the head wind) can be used to save fuel rather than time via a speed reduction. This may be desirable if the time savings are of less value than the corresponding fuel savings available. FIG. 4C illustrates how the value of time savings can vary with how the ETA (estimated time of arrival) compares with the original STA (scheduled time of arrival).

Those skilled in the art will appreciate that numerous modifications and variations may be made to the above disclosed embodiments without departing from the spirit and scope of the present invention.

What is claimed is:

1. A method for providing a rerouting decision, said method comprising the steps of:
    identifying a first candidate reroute of a flight plan to a destination of an aircraft during flight;
    determining whether to request the first candidate reroute of the flight plan by:
        identifying a plurality of later possible reroutes that initiate at a later time than the first candidate reroute;
        determining an individual probability of acceptance by an air traffic controller and an individual expected savings for each of the first candidate reroute and the plurality of later possible reroutes;
        determining a plurality of first reroute sequences, wherein each of the first reroute sequences includes a request for the first candidate reroute and one or more of the plurality of later possible reroutes;
        determining a plurality of second reroute sequences, wherein each of the second reroute sequences excludes a request for the first candidate reroute and includes a request for one or more of the plurality of later possible reroutes;
        determining a probability of acceptance by the air traffic controller for each of the plurality of first route sequences based on the individual probabilities of acceptance associated with the first candidate reroute and the plurality of later possible reroutes;
        determining a probability of acceptance by the air traffic controller for each of the plurality of second route sequences based on the individual probabilities of acceptance associated with the plurality of later possible reroutes;
        determining an overall expected savings for each of the plurality of first reroute sequences based on the probability of acceptance determined for that first reroute sequence and the individual expected savings associated with the first candidate reroute and the plurality of later possible reroutes included in that first reroute sequence;
        determining an overall expected savings for each of the plurality of second reroute sequences based on the probability of acceptance determined for that second reroute sequence and the individual expected savings associated with the plurality of later possible reroutes included in that second reroute sequence; and
        comparing a maximum overall expected savings associated with the plurality of first reroute sequences that includes the request for the first candidate reroute and against a maximum overall expected savings associated with the plurality of second reroute sequences that excludes the request for the first candidate reroute; and
    communicating over a controller-pilot data communications link a recommended rerouting decision to request the first candidate reroute in response to determining that the maximum overall expected savings associated with the plurality of first reroute sequences that includes the request for the first candidate reroute is greater than the maximum overall expected savings associated with the plurality of second reroute sequences that excludes the request for the first candidate reroute,
    wherein the foregoing steps are performed by a processing system in real time during flight of the aircraft.

2. The method as claimed in claim 1, further comprising constructing a binary decision tree that represents the plurality of first reroute sequences and the plurality of second reroute sequences.

3. The method as claimed in claim 1, further comprising wherein the recommended rerouting decision is not to request the first candidate reroute in response to determining that the maximum overall expected savings associated with the plurality of second reroute sequences that excludes any request for the first candidate reroute is greater than the maximum overall expected savings associated with any of the plurality of first reroute sequences.

4. The method as claimed in claim 1, wherein the probability of acceptance for each first route sequence is determined by computing the product of the individual probabilities of acceptance associated with the first candidate reroute and one or more of the plurality of later possible reroutes included in the first reroute sequence.

5. The method as claimed in claim 1, wherein the probability of acceptance for each second route sequence is determined by computing the product of the individual probabilities of acceptance associated with one or more of the plurality of later possible reroutes included in the second reroute sequence.

6. The method as claimed in claim 1, wherein the overall expected savings for each first reroute sequence is determined by computing the product of the probability of acceptance associated with the first reroute sequence and the sum of the individual expected savings associated with the first candidate reroute and one or more of the plurality of later possible reroutes included in the first reroute sequence.

7. The method as claimed in claim 1, wherein the overall expected savings for each second reroute sequence is determined by computing the product of the probability of acceptance associated with the second reroute sequence and the sum of the individual expected savings associated with one or more of the plurality of later possible reroutes included in the second reroute sequence.

8. The method as claimed in claim 1, wherein the recommended rerouting decision is communicated from an Air Route Traffic Control Center using controller-pilot data link communications technology.

9. The method as claimed in claim 1, wherein the individual probability of acceptance determined for each of the first candidate reroute and the plurality of later possible reroutes is based on a route complexity factor, a controller workload factor, a frequency of use factor, and a constraint proximity factor.

10. The system as claimed in claim 9, wherein the route complexity factor is based on the number of fixes and jet routes.

11. The system as claimed in claim 9, wherein the controller workload factor is based on one or more of:
a current traffic loading,
a presence of convection weather,
data regarding traffic entry and exit events,
a number of climbing or descending flights in a sector,
aircraft reroutes that clip any of an airspace sector or a center corner, and
aircraft reroutes that run along an airspace sector or center boundary requiring coordination between controllers.

12. The method as claimed in claim 9, wherein the frequency of use factor is based on a historical use of a reroute.

13. The system as claimed in claim 9, wherein the constraint proximity factor is based on one or more of:
a currently closed airspace, a location of heavy convection weather, and air traffic.

14. The system as claimed in claim 1, wherein the maximum overall expected savings identified for at least one of the plurality of first reroute sequences and at least one of the plurality of second reroute sequences is one or more of a time savings and a fuel savings.

* * * * *

UNITED STATES PATENT AND TRADEMARK OFFICE
CERTIFICATE OF CORRECTION

PATENT NO. : 11,348,473 B2
APPLICATION NO. : 16/529933
DATED : May 31, 2022
INVENTOR(S) : Cornelius George Hunter It is certified that error appears in the above-identified patent and that said Letters Patent is hereby corrected as shown below:

In the Specification

In Column 2, Line 38, should read:
"FIGS. 12A-12D show an illustrative diagrammatic repre-"

In Column 12, Line 32, should read:
"The FIG. 11 calculation is repeated for the FIGS. 12B, 12C,"

In the Claims

In Column 16, Line 5, Claim 10 should read:
"The method as claimed in claim 9, wherein the route"

In Column 16, Line 8, Claim 11 should read:
"The method as claimed in claim 9, wherein the"

In Column 16, Line 21, Claim 13 should read:
"The method as claimed in claim 9, wherein the"

In Column 16, Line 25, Claim 14 should read:
"The method as claimed in claim 1, wherein the"

Signed and Sealed this
Twenty-third Day of August, 2022

Katherine Kelly Vidal
*Director of the United States Patent and Trademark Office*